July 14, 1959

C. ALINARI 2,894,709

PANORAMIC MOUNT FOR CINEMATOGRAPHIC CAMERAS

Filed March 12, 1958

United States Patent Office 2,894,709
Patented July 14, 1959

2,894,709

PANORAMIC MOUNT FOR CINEMATOGRAPHIC CAMERAS

Carlo Alinari, Turin, Italy

Application March 12, 1958, Serial No. 720,956

Claims priority, application Italy March 16, 1957

6 Claims. (Cl. 248—186)

This invention relates to a panoramic mount for cinematographic cameras, of the type in which a movable mount portion is supported by a stationary mount portion through rollers which are radially arranged and coupled through multiplying gears with an inertia governor adapted to render the rotational movement of the mount uniform. Such mounts are usually referred to as "gyroscopic mounts."

It is the object of this invention to provide a panoramic mount of the type referred to above which, though affording an excellent uniformity in movement of the cinematographic camera mounted thereon is of considerably reduced dimensions and overall size and simple and inexpensive in construction.

A further object of this invention is to provide a panoramic mount in which no axial or radial force is exerted on the flywheel shaft by the motion transmitting gears, both with a view to reducing friction and making the flywheel shaft thinner, so that a small-sized driving pinion can be employed.

In the improved panoramic mount for cinematographic cameras a toothed wheel is keyed to the inner end of two diametrically opposite rollers and meshes with a toothed wheel freely rotatable on a central shaft securedly fixed to a flywheel.

Moreover the mount is provided in addition to the two carrying rollers with at least two balancing rollers slightly smaller in diameter than the carrying rollers.

Further features of this invention will be understood from the appended specification with reference to the accompanying drawings given by way of example, wherein.

Figure 1:
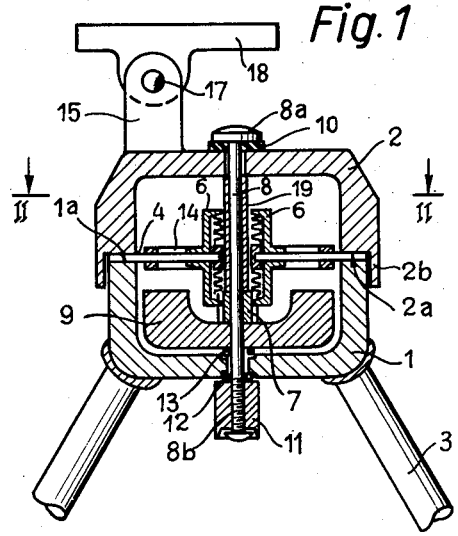
Figure 1 is an axial sectional view of the mount.
Figure 2:
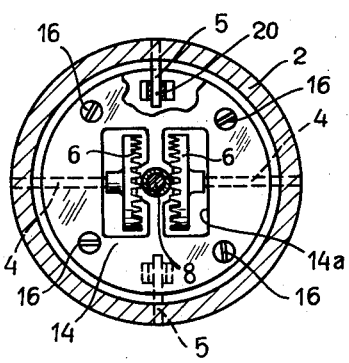
Figure 2 is a sectional view of Figure 1 on line II—II.
Figure 3:
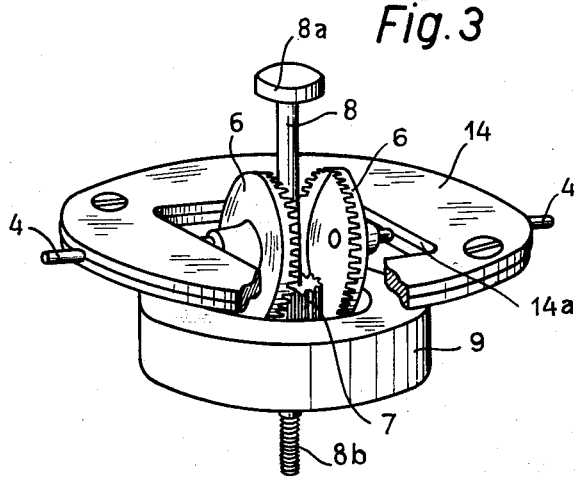
Figure 3 is a perspective view of the gears transmitting motion from the rollers to the flywheel.

The stationary mount portion 1 is supported by legs 3 in a conventional manner. Both the stationary mount portion 1 and movable mount portion 2 are cup-shaped. The movable mount portion 2 is provided on its edge or rim with a skirt 2b overlapping the edge of the stationary portion and adapted to oppose the displacements of the movable portion with respect to the stationary mount portion transversely of the rotational axis.

The movable mount portion bears on the rim of the stationary portion 1 through rollers 4, 5 rolling in contact with annular surfaces 2a and 1a on the movable and stationary mount portion, respectively. The two portions jointly define a housing for an inertia governor mechanism later herein described.

The rollers 4 are axially aligned with each other and extend on opposite sides of the mount axis.

The rollers 5 are likewise axially aligned and extend on opposite sides of the mount axis, the axes of the rollers 4 and 5, respectively, being perpendicular to each other.

The inner ends of the rollers 4 each have keyed thereto a toothed crown 6, both crowns 6 meshing with a toothed pinion 7 freely rotatable on a shaft 8, the axis of which coincides with the mount axis. The pinion 7 is fixedly secured to a flywheel 9 which renders the rotational movement of the movable mount portion 2 uniform.

The shaft 8 is provided at the top with a knob 8a resting on the movable portion 2 of the mount through a rubber washer 10. The lower portion of the shaft 8 is screw-threaded at 8b and has screwed thereon a locknut 11 bearing against the lower face of the stationary portion 1 of the mount through balls 12.

In this manner the shaft 8 also acts as a brace for imparting or annulling a diametrical thrust on the rollers for the purpose of coupling the latter for rotation with the movable mount portion or uncoupling them therefrom.

The flywheel, which is freely rotatable about the shaft 8, bears on balls 13 riding in a seating provided in the bottom of the mount portion 1. A tubular spacer 19 is arranged about the shaft 8 over the pinion 7 for the purpose of holding the latter in an axial direction.

The rollers 4, 5 are accommodated by holes radially bored in a supporting disc 14 which is divided, the two disc halves being secured together by screws 16. Openings are cut in the supporting disc, the edges of said openings being denoted by 14a, the openings accommodating the toothed crowns 6. The rollers 5 are materially shorter than the rollers 4 and merely serve for balancing purposes. The rollers 5 have secured thereto axially retaining bushes 20 accommodated by openings cut in the disc 14. In order to safely transmit motion from the rollers 4 to the flywheel 9 on tightening of the nut 11, the rollers 4 just slightly exceed in diameter the rollers 5.

It will be seen that neither radial nor axial thrust is transmitted in the improved panoramic mount to the flywheel shaft 8 on account of the configuration and arrangement of the gearing which transmits motion to the flywheel. Moreover, by virtue of the high efficiency of transmission between the toothed crowns 6 and pinion 7, the rollers are subjected to low stresses, so that they can be made of small size, thereby increasing the transmission ratio between the movable mount portion 2 and flywheel 9.

The movable mount portion 2 is provided with brackets 15 between which a conventional support 18 for the cinematographic camera is pivoted at 17. The articulation 17 can be of the friction or inertia adjustment type. In the latter case a device similar to the improved one can be employed.

I do not wish to limit myself to the embodiment and constructional details described above and shown on the drawing, as further modifications can be made within the scope of the appended claims.

What I claim is:

1. In a panoramic mount for motion picture cameras of the type having a stationary, dished, mount portion, a movable dished camera mount portion movably supported on said stationary portion in inverted position jointly defining a housing with said stationary portion, an inertia governor mechanism in said housing comprising, a centrally disposed shaft in said stationary portion extending axially therein in a direction toward the movable mount portion, a pinion rotatably mounted on said shaft, a flywheel fixed to said pinion disposed radially spaced inwardly of said stationary portion for pivotally rotating around said shaft, a pair of diametrically disposed support pin rollers rotatably supported on the stationary portion for rotatably supporting the movable portion on said stationary portion and extending radially inwardly toward said shaft, each of said rollers having a crown fixed thereon having axially extending teeth engaging said pinion.

2. In a panoramic mount according to claim 1, including two balancing pin rollers rotatably supported on the stationary portion, angularly spaced from said support rollers and having a slightly smaller diameter than the support rollers.

3. In a panoramic mount according to claim 1, in which each of said dished portion has a mouth and a peripheral rim defining the mouth, said portions being disposed with the rims thereof juxtapositioned, the movable portion having a skirt disposed radially outwardly of the stationary portion for limiting radial movement of the movable portion relative to the stationary portion, said central shaft extending axially through said movable portion and having a knobbed end portion for bearing on an external surface of said movable portion and a threaded opposite end portion, extending externally of said stationary portion, a nut on said threaded end portion for adjustably controlling the pressure on the support rollers and said two portions, and said rollers being disposed on the rim of said stationary portion between the rims of the two portions.

4. In a panoramic mount according to claim 3, including ball bearings between said nut and the stationary portion.

5. In a panoramic mount according to claim 1, including ball bearings rotatably supporting said flywheel on the inner bottom of said dished stationary portion.

6. In a panoramic mount according to claim 1, including a disc disposed in said housing concentrically with said shaft and radially spaced from the shaft and housing, said support rollers extending radially through said disc and rotatable therein.

References Cited in the file of this patent
UNITED STATES PATENTS

| | | |
|---|---|---|
| 25,155 | Williams | Aug. 16, 1859 |
| 1,798,446 | Zerk | Mar. 31, 1931 |